(12) United States Patent
Adamson et al.

(10) Patent No.: US 7,861,745 B2
(45) Date of Patent: Jan. 4, 2011

(54) MINE BLENDER HOSE

(75) Inventors: Wallace Adamson, Sebastian, FL (US);
Kelley J. Boone, Vero Beach, FL (US);
Kevin J. Wojciechowski, Olmsted Township, OH (US); Victor J. Miller, Salt Lake City, UT (US)

(73) Assignee: Parker-Hannifin Corporation, Cleveland, OH (US)

( * ) Notice: Subject to any disclaimer, the term of this patent is extended or adjusted under 35 U.S.C. 154(b) by 464 days.

(21) Appl. No.: 11/861,508

(22) Filed: Sep. 26, 2007

(65) Prior Publication Data

US 2008/0264508 A1   Oct. 30, 2008

Related U.S. Application Data

(60) Provisional application No. 60/826,944, filed on Sep. 26, 2006.

(51) Int. Cl.
*F16L 11/00* (2006.01)

(52) U.S. Cl. ........................ 138/111; 138/116; 138/144; 366/167.1

(58) Field of Classification Search ................. 138/111, 138/144, 177, 178; 366/167.1, 173.1, 173.2, 366/174.1, 175.2
See application file for complete search history.

(56) References Cited

U.S. PATENT DOCUMENTS

| | | | | |
|---|---|---|---|---|
| 2,773,513 A | 12/1953 | Isenberg | ...................... | 138/111 |
| 2,743,960 A | 9/1954 | Kamin | ...................... | 239/266 |
| 2,753,215 A | 6/1955 | Barr | ...................... | 239/447 |
| 3,028,289 A | 12/1957 | Roberts et al. | ...................... | 156/143 |
| 2,934,096 A | 4/1960 | Hose | ...................... | 138/111 |
| 3,269,422 A | 8/1966 | Matthews et al. | ...................... | 138/111 |
| 3,315,703 A | 4/1967 | Matthew et al. | ...................... | 138/111 |
| 3,325,703 A | 6/1967 | Rutz | ...................... | 257/105 |
| 3,400,737 A * | 9/1968 | Matthews et al. | ...................... | 138/111 |
| 3,567,134 A | 3/1971 | Smith | ...................... | 239/547 |
| 3,626,985 A | 12/1971 | Erickson | ...................... | 138/45 |
| 3,791,255 A | 2/1974 | Fox et al. | ...................... | 86/20.15 |
| 3,903,929 A | 9/1975 | Mock | ...................... | 138/115 |
| 4,086,937 A | 5/1978 | Hechler, IV | ...................... | 137/559 |
| 4,194,536 A | 3/1980 | Stine et al. | ...................... | 138/149 |
| 4,273,147 A | 6/1981 | Olney | ...................... | 137/13 |

(Continued)

FOREIGN PATENT DOCUMENTS

DE   39 10 796 A1   10/1990

(Continued)

OTHER PUBLICATIONS

PCT International Search Report and Written Opinion of the International Searching Authority mailed May 13, 2008 in corresponding Application No. PCT/US2007/079494.

*Primary Examiner*—Patrick F Brinson
(74) *Attorney, Agent, or Firm*—Renner, Otto, Boisselle & Sklar, LLP

(57) ABSTRACT

A flexible hose construction adapted for separately conveying two or more fluids therethrough. The construction includes a core tube, a second tube helically disposed about the core tube, and a tubular jacket surrounding the core tube. The second tube may be substantially concentric with the core tube. The tubular jacket may be substantially cylindrical so as to have a substantially smooth outer surface.

20 Claims, 3 Drawing Sheets

U.S. PATENT DOCUMENTS

| | | |
|---|---|---|
| 4,336,415 A | 6/1982 | Walling ........................ 174/47 |
| 4,368,219 A | 1/1983 | Nagata et al. ................ 427/236 |
| 4,510,958 A | 4/1985 | Coursen ....................... 137/13 |
| 4,531,551 A | 7/1985 | Eichelberger et al. ........ 138/129 |
| 4,615,752 A | 10/1986 | Miller ..................... 149/108.8 |
| 5,524,523 A | 6/1996 | Lubbe et al. ................ 86/20.15 |
| 5,746,255 A | 5/1998 | Walsh et al. ................. 138/115 |
| 2002/0198491 A1 | 12/2002 | Miller et al. ............. 604/96.01 |

FOREIGN PATENT DOCUMENTS

GB    2 204 343 A    11/1988

\* cited by examiner

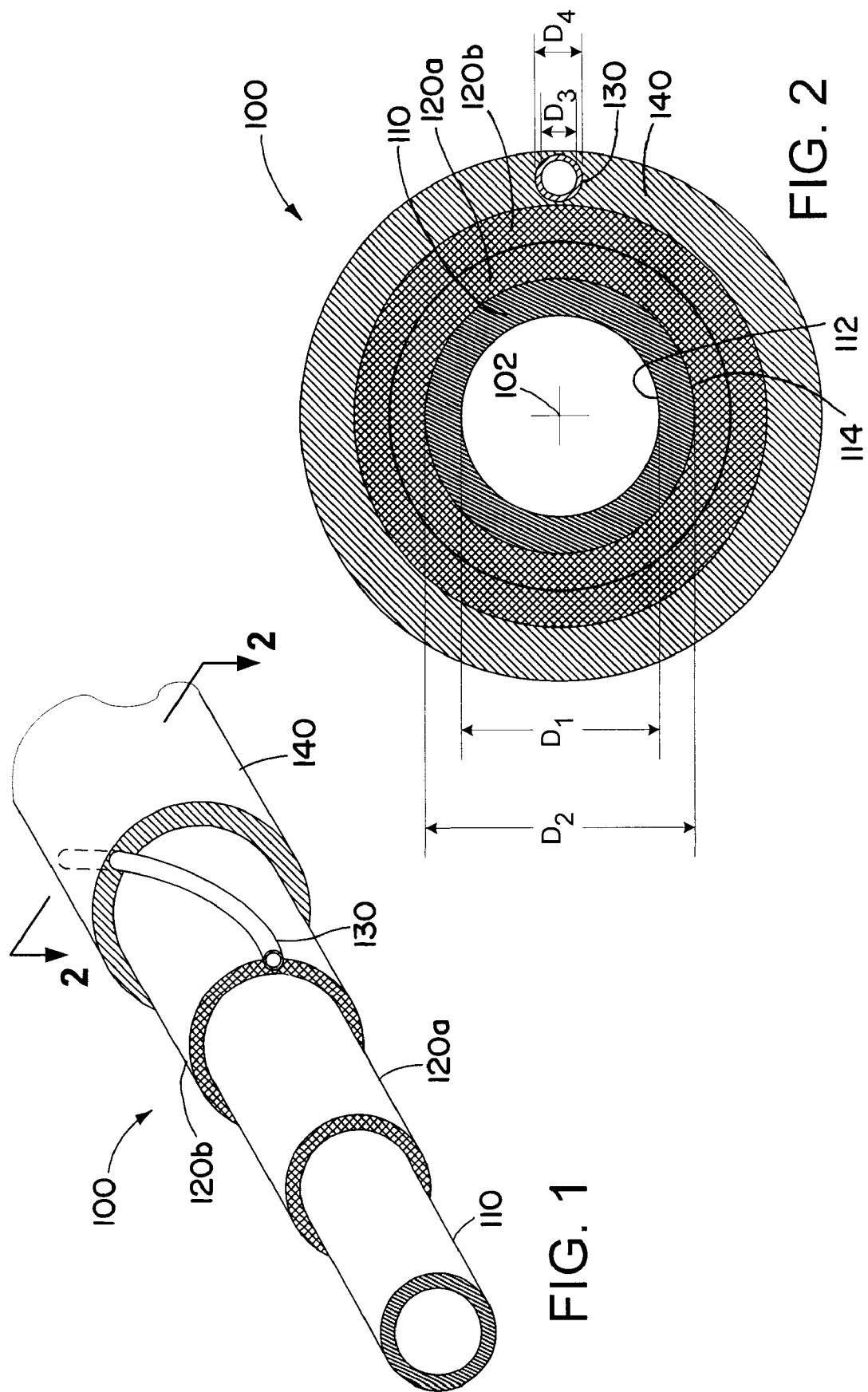

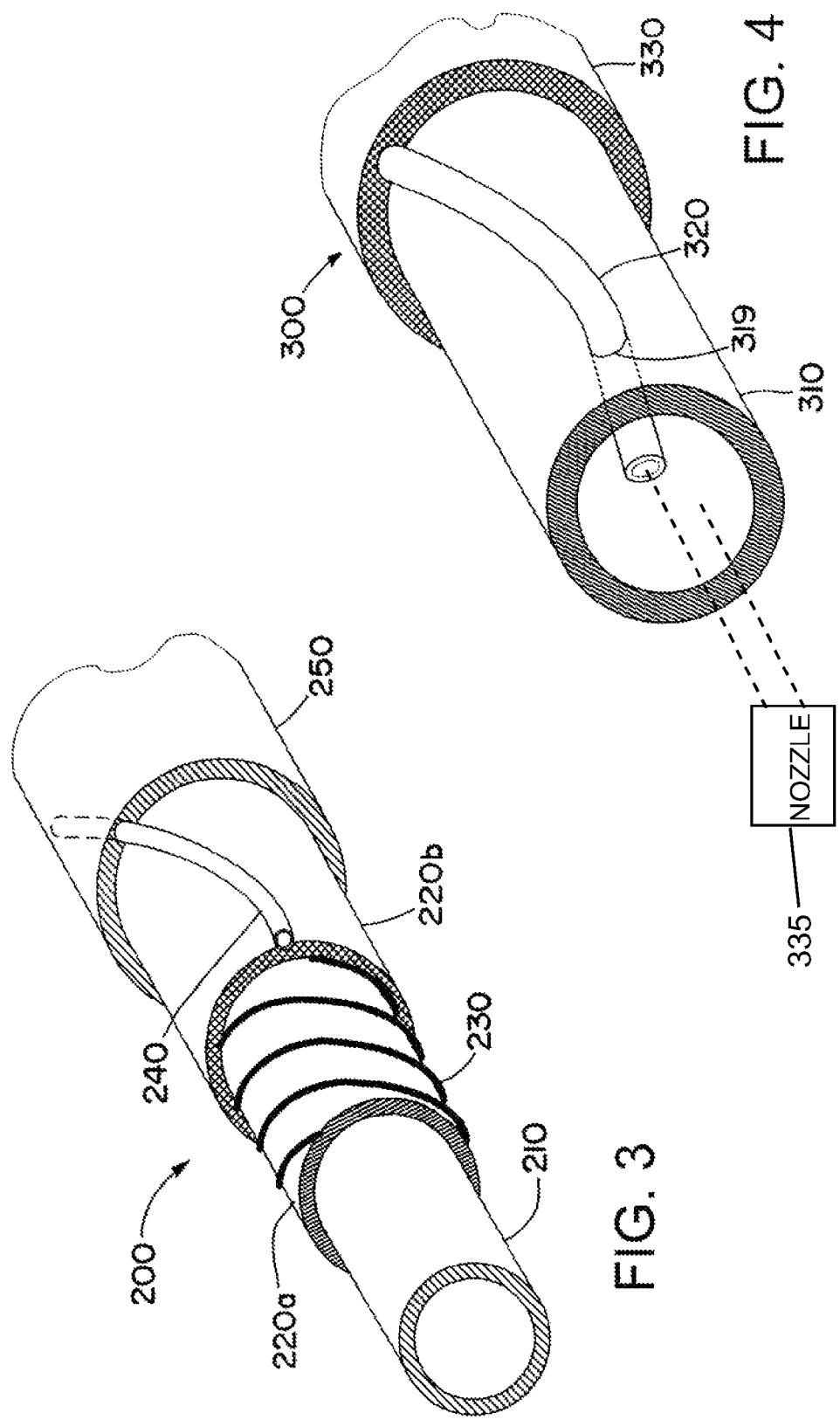

MINE BLENDER HOSE

CROSS-REFERENCE TO RELATED APPLICATIONS

The present application claims the benefit of the filing date of U.S. Provisional Application Ser. No. 60/826,944, filed Sep. 26, 2006.

FIELD OF THE INVENTION

The present invention broadly relates to a flexible hose for fluid transfer applications, and more particularly to a hose construction for separately conveying or transferring at least two fluids via first and second conduits within the hose.

BACKGROUND

Conventional hose structures for fluid transfer applications (fluid handling hoses) are typically constructed as having a tubular core for transferring fluids. The tubular core is often surrounded by one or more reinforcement layers, which are in turn protected by a surrounding outer sheath or cover. The cover typically protects the core tube from external conditions and provides the hose with some degree of abrasion resistance. The cover may be made from the same or different materials as the core tube. In normal use, fluid handling hoses are used in a variety of applications and may be exposed to a variety of environmental factors and mechanical stresses that cannot always be predicted. It is desirable for the hose to have a strong mechanical integrity to withstand both the internal and external mechanical stresses placed on the hose during use. It is also desirable, in many circumstances, for the hose to be flexible but, at the same time, not prone to kinking. Flexibility is often desirable to facilitate handling of the hose by an operator during use and for storing and/or transporting the hose.

Hoses may be used, for example, for delivering fluids to subterranean structures or environments. As a particular example, fluid handling hoses are employed in surface mining operations to deliver fluids to holes located just beneath the earth's surface. Surface mining involves mining material from the earth's surface rather than in a mine tunnel. Typically, a surface mining operation involves drilling one or more bore holes into the ground or surface to be mined, filling the bore holes with a liquid explosive, and blasting the material so as to break the surface and area surrounding the bore hole into smaller pieces that can be removed from the mining site. A single hose is used to convey the explosive and facilitate filling the bore hole(s). The hose is typically connected to a reel-up device for inserting and removing the hose from a bore hole. Therefore, hoses for such operations should be relatively flexible for handling the hose. Additionally, it is desirable for the hose to have a relatively smooth outer surface so that the hose does not catch or snag the surface as the hose is being inserted into, or more particularly, as it is being removed from the bore hole.

In some situations, it may be desirable to provide an explosion having a force greater than the force obtained from the explosive material alone. A secondary material or catalyst may be added to the primary explosive material to provide a stronger explosion. Depending on the reactivity of the primary explosive material and the catalyst, the secondary material or catalyst typically cannot be mixed or combined with the explosive until just a short time prior to the explosion. The secondary material or catalyst may be added while filling the bore hole with the explosive, but must be added as the hose conveying the explosive material is being pulled out of the bore hole. Thus, a second hose is required for separately transferring or conveying the secondary material or catalyst to the bore hole. This may require additional operators to handle the separate hoses.

SUMMARY

The present invention provides a hose construction that is capable of transferring or conveying two or more fluids. The hose comprises multiple conduits or tubes for separately transferring fluids and also comprises a tubular jacket (which may also be referred to as an outer cover or sheath) surrounding the conduits. Despite comprising multiple conduits, the present invention provides a hose that is flexible, has suitable mechanical properties to withstand internal and external mechanical stresses, such as fluid pressure through the conduits, such that the fluid-conveying conduits or tubes do not collapse, and/or is substantially cylindrical such that the cover, and the overall hose construction, has a substantially smooth outer surface.

Accordingly, in one aspect, the present invention provides a flexible hose for separately conveying at least two fluids from a proximal end of the hose to a distal end of the hose, in which the hose comprises: a core tube extending longitudinally from the proximal end to the distal end of the hose, the core tube for conveying a first fluid; a second tube helically wound about the core tube, the second tube for conveying a second fluid; and a tubular jacket surrounding the second hose and the core tube, where the tubular jacket is substantially concentric with the core tube.

The second tube may be partially embedded in the tubular jacket.

The tubular jacket, and thus the hose, may have a substantially cylindrical outer surface. A substantially cylindrical outer surface may provide a substantially smooth outer surface for the hose. The outer surface of the tubular jacket (or hose) may be slightly profiled in the region adjacent to and surrounding the second tube, but the hose may still have a substantially cylindrical surface.

The second tube may have an outer diameter smaller than the outer diameter of the core tube. The second tube may also have an inner diameter smaller than the inner diameter of the core tube.

The core tube may be surrounded by one or more reinforcement layers. The reinforcement layers surrounding the core tube may be disposed intermediate the core tube and the second tube.

The second tube may be surrounded by one or more reinforcement layers.

The present invention also provides, in one aspect, a flexible hose for separately conveying at least two fluids from a proximal end of the hose to a distal end of the hose, in which the hose comprises: a core tube extending longitudinally from the proximal end of the hose to the distal end of the hose, the first tube for conveying a first fluid; a second tube helically wound about the core tube, the second tube for conveying a second fluid; and a tubular jacket surrounding the second tube and the core tube, wherein the tubular jacket has a substantially cylindrical outer surface.

The hose may be configured such that the core tube comprises a first aperture and at least a portion of the second tube is disposed through the aperture such that at least a portion of the second tube is located within the interior region or bore of the core tube. Locating at least a portion of the second tube within the bore or interior region of the core tube allows the fluid from the second tube to be introduced into a portion of the first tube and at least partially combined or mixed with the fluid in the core tube.

The present invention also provides methods of making and using such hoses.

The present invention also provides a method of introducing different reactants into a subterraneous structure, in which the method comprises: introducing a fluid handling hose to a bore hole in the subterraneous structure, the fluid handling hose comprising a first conduit for conveying a first reactant, and a second conduit for conveying a second reactant; conveying the first and second reactants to a down hole location of the bore hole; and combining the reactants.

The method may include introducing the reactants into the bore hole substantially simultaneously and mixing the reactants within the bore hole.

The method may include attaching a nozzle to a distal end of the hose, where the nozzle is in fluid communication with a distal end of each of the first and second conduits, and partially mixing the reactants within the nozzle.

The method may employ a hose comprising a core tube extending longitudinally from the proximal end to the distal end of the hose, the core tube for conveying a first fluid; a second tube helically wound about the reinforcement layer, the second tube for conveying a second fluid; and a tubular jacket surrounding the second hose and the core tube, the second hose being substantially concentric with the core tube.

The method may be employed in a surface mining operation, and the first reactant may be an explosive material, and the second reactant may be a catalyst.

These and other features of the present invention will become apparent from the following detailed description in conjunction with the drawings.

BRIEF DESCRIPTION OF THE DRAWINGS

In the annexed drawings:

FIG. 1 is a perspective, cut-away view of a hose construction in accordance with one embodiment of the invention;

FIG. 2 is a radial cross-sectional view of the hose construction in FIG. 1 taken through the line 2-2;

FIG. 3 is a perspective, cut-away view of a hose construction in accordance with another embodiment of the invention; and FIG. 4 is a perspective, cut-away view of a hose construction in accordance with another embodiment of the invention.

Figure 2A:
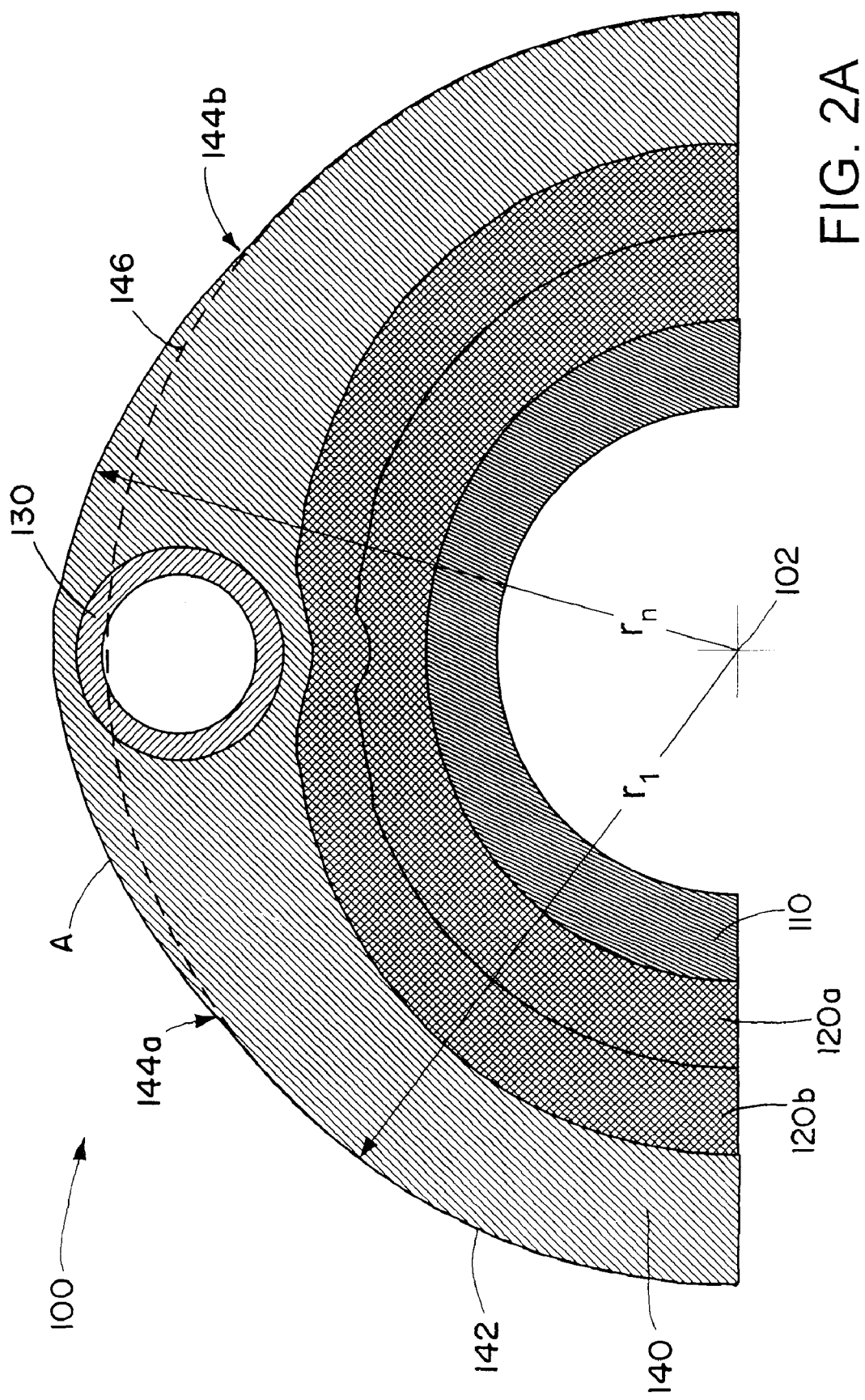
FIG. 2A is an enlarged view of a portion of the hose in FIG. 2.

The drawings will be described further in connection with the following detailed description.

DETAILED DESCRIPTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" and "axial" referring, respectively, to directions perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

The present invention provides a hose construction suitable for separately conveying or transferring two or more fluids therethrough, methods of making or manufacturing such hose constructions, and methods of using such hose constructions. A hose construction may include a core tube, a second tube wound about the core tube (or core tube and reinforcement layer), and a tubular jacket or cover layer surrounding the second tube and the core tube. The core tube and the second tube provide separate conduits suitable for separately conveying fluids through the hose construction.

Referring now to FIGS. 1 and 2, an exemplary hose 100 comprises a core tube 110, a first reinforcement layer 120a surrounding the core tube, a second reinforcement layer 120b surrounding the first reinforcement layer, a second tube 130 disposed about the second reinforcement layer, and a tubular jacket 140 surrounding the second tube and the second reinforcement layer. In basic dimensions, the hose 100 extends axially to an indefinite length along a central longitudinal axis 102.

It will be appreciated that in an embodiment in which there is no reinforcing layer surrounding the core tube, the second tube would generally be disposed directly adjacent the core tube and the tubular jacket would immediately surround the second tube and the core tube. If desired, an additional material may be disposed between the core tube and the second tube to keep the second tube in place prior to forming the tubular jacket over the core and the second tube.

The core tube 110 may be made from any material as desired for a particular purpose or intended use. In particular, the material for the core tube may be selected based on the particular application envisioned and more particularly based on the fluid to be conveyed through the core tube. Suitable materials for the core tube include, but are not limited to, polymeric materials including thermoplastic materials, such as polyesters, polyurethanes, polyolefins, polyvinyl chlorides (PVCs), polyacetals, ethylene vinyl alcohols (EVAs), polyoxymethylenes (POMs), silicone, thermoplastic rubbers, polyurethanes, or polyamides such as, for example, Nylon 6, 6/66, 11, 12, or 6/12, and the like. Alternatively, the core tube 110 may be a vulcanizable, i.e., thermosetting, or melt-processible, i.e., thermoplastic, natural or synthetic rubber such as a fluoropolymer, chlorosulfonate, polybutadiene, butyl, neoprene, nitrile, polyisoprene, and buna-N, copolymer rubbers such as ethylene-propylene (EPR), ethylene-propylene-diene monomer (EPDM), nitrile-butadiene (NBR), and styrene-butadiene (SBR), or blends such as ethylene or propylene-EPDM, EPR, or NBR, and copolymers and blends of any of the foregoing. The term "synthetic rubbers" also should be understood to encompass materials that may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

The core tube 110 has a circumferential inner core tube surface 112 defining the inner diameter $D_1$ of the hose 100 and a circumferential outer core tube surface 114 defining the outer diameter $D_2$. The core tube may have an inner diameter that is substantially cylindrical so as to provide a substantially smooth bore. As with the overall dimensions of hose 100, the wall thickness of core tube 110 may vary for the particular application envisioned. For example, the core tube may have an inner diameter of from about 0.5 to about 12 inches, and an outer diameter of from about 0.5 to about 13 inches. The wall thickness of the core tube may be, for example, from about 0.01 to about 1 inch.

The core tube may be provided as a unitary, single-layer construction or as a composite multi-layer construction (not illustrated). Multi-layer constructions may include (i) an outermost layer that may be, as described above, formed of a relatively flexible polymeric material or a natural or synthetic rubber, and (ii) an innermost layer. For chemical resistance, the innermost layer may be provided as extruded or otherwise formed of a melt-processible thermoplastic which may be a fluoropolymer, polyamide, or co-polyester. As used herein, "chemical resistance" should be understood to mean the ability to resist swelling, crazing, stress cracking, corrosion, or otherwise to withstand attack from fluids that may be transferred through the core tube including, but not limited to, mild acidic or alkaline solutions, phosphate-ester solutions, alcohols, organic solvents, hydrocarbons, as well as inorganic solvents such as water or brine. Suitable fluoropolymers for the inner include, but are not limited to, polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetraflurorethylene (ETFE) terpolymer, polyvinylidene fluoride (PVDF), polyvinylfluoride (PVF), and copolymers and blends thereof.

In a multi-layer core tube construction, the material for an outer layer of the core tube may be selected for flexibility, that is, as having a lower flexural modulus than that of the material forming the inner layer of the core tube, or otherwise for temperature performance and/or compatibility with the inner layer. The outer layer may be formed of a material that is compatible with or otherwise bondable directly to an inner layer. Alternatively the two layers may be bonded, if incompatible, by means of an adhesive or tie layer. For strength and flexibility considerations, in a core tube with a multi-layer construction, the wall thickness of the outer wall of the core tube may be thicker than that of the inner layer of the core tube.

In a hose with a multi-layered core tube, the layers of the core tube may be fabricated by extrusion, co-extrusion, or sequential extrusion and, if formed of compatible materials, thereby cross-linked or otherwise chemically or fusion bonded together at their interface into an integral, tubular composite structure. If formed of chemically dissimilar or otherwise incompatible materials, however, an adhesion-promoting surface treatment may be applied or an intermediate tie or bonding layer may be co-extruded, i.e., "tri-extruded," with the inner and outer layers of the core tube, or sequentially extruded or over-coated therebetween, as being formed of a material which is adhesion bond compatible with both the materials of the core tube layers. Preferably, the intermediate layer is formed of material that is also resistant to solvent permeation, and which generally is more elastic than the material forming the inner layer. Suitable materials for the tie layer include, for example, PVDF, PVF, polyvinyl acetate (PVA), methyl acrylics, urethanes, polyvinyl chlorides, polyolefins, and copolymers, alloys, and blends thereof, as well as thermoplastic or thermosetting rubbers. The wall thickness of an intermediate layer typically will be less than or about equal to the wall thickness of inner layer.

As shown in FIGS. 1 and 2, the hose 100 includes reinforcement layers 120a and 120b disposed about the core tube. It will be appreciated, however, that a hose in accordance with the present invention may or may not be reinforced. As such, a hose may include 0, 1, 2, or more reinforcing layers as desired. Reinforcement layers are known in the art and may be conventionally formed as braided, knitted, wrapped, or, spiral wound of, for example, from 1 to about 60 ends of monofilament, continuous multi-filament, i.e., yarn, stranded, cord, roving, thread, tape, or ply, or short "staple" strands of a fiber material. The fiber material may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or mixtures of two or more thereof. In a braided construction, which also may contain additional spiral wound, wrapped, and/or knitted layers, each of the reinforcement layers may be braided under tension at a pitch angle of, for example, between about 45-63° using from between 12-96 carriers each having from 1 to about 32 ends of a 420-6600 denier (470-7400 decitex), multi-filament aramid, polyester, nylon, PVA, or PBO yarn.

The reinforcement layer(s) may also be a metal wire such as a steel, which may be stainless or galvanized, cold drawn steel, brass, zinc or zinc-plated, or other metal wire, or a blend thereof. With reference to FIG. 3, an exemplary hose 200 comprises a core tube 210, a reinforcement layer 220a surrounding the core tube, a wire reinforcement layer 230 surrounding the reinforcement layer 220a, a reinforcement layer 220b surrounding the wire reinforcement layer 230, a second tube 240 wound about the reinforcement layer 220b, and a tubular jacket 250 surrounding the second tube and the reinforcement layer 220b.

Where the hose includes two or more reinforcement layers, the respective reinforcement layers may be made from the same or different materials. For example, a hose could be provided with two or more reinforcing fiber or fabric reinforcement layers. As another example, a hose could include a fabric reinforcement layer surrounded by a metal reinforcement layer. The number of reinforcement layers and their arrangement may be selected as desired for a particular purpose or intended use, and may be selected based upon the desired characteristics of the hose including the desired strength, elongation, weight, flexibility, and/or volumetric expansion characteristics of the individual tubes (e.g., the core tube and/or the second tube) and/or the overall hose. The pitch angle of the reinforcement layer may also be selected based upon the desired characteristics of the hose.

In a reinforced hose, the core tube, the second tube, or both the core tube and the second tube may be surrounded by one or more reinforcement layers. Where the hose includes a reinforcement layer around the core tube, the reinforcement is generally disposed about the outer diameter of the core tube and intermediate the outer diameter of the core tube and the other diameter of the second tube. Similarly, when the second tube is surrounded by a reinforcement layer, the reinforcement layer surrounds the outer diameter of the second tube and a portion of the reinforcement layer is disposed intermediate the second tube and the core tube.

In a reinforced hose, it may be desirable to provide a fill layer disposed about one or more of the reinforcement layers. The fill layer fills in openings in a fiber reinforcing layer and/or the area between helical turns in a wire reinforcement layer. The filler may also provide adhesive properties and maintain the adherence between the various layers of the hose. For example, the fill layer may serve as an adhesion layer to maintain the adhesion of the second tube to the hose carcass (i.e., the core tube and any reinforcement layers disposed about the core tube) prior to applying the cover to form the hose construction. Suitable materials for the fill layer include, but are not limited to, an elastomeric material such as a rubber, materials exhibiting rubber-like properties, and the like. The fill layer may be the same material as the tubular jacket or may be a different material. The fill layer may have any thickness suitable for a particular purpose or intended use. For example, the fill layer may have a thickness of from about 0.0012 to about 0.0024 inches.

The second tube (e.g., tubes 130 or 240) may be formed from any material suitable for a particular purpose or intended use. For example, the second tube may be formed from a material that is chemically resistant to the fluid to be conveyed through the tube. Suitable materials include materials suitable as the core tube including plastics such as polyamides, polyesters, polyurethanes, polyolefins, polyvinyl chlorides, polyacetals, ethylene vinyl alcohols, polyoxymethylenes, natural rubbers such as Hevea, and thermoplastic, i.e., melt-processible, or thermosetting, i.e., vulcanizable, synthetic rubbers such as a fluoropolymer, chlorosulfonate, polybutadiene, butyl, neoprene, nitrile, polyisoprene, and buna-N, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR, and copolymers and blends of any of the foregoing. The second tube may be formed from the same material as the core tube, or may be formed from a different material.

As described above, the second tube may be surrounded by one or more reinforcement layers. The number of reinforcement layers and the materials for such reinforcement layers may be selected to provide desired characteristics for the second tube and the hose as a whole. Material suitable for the reinforcement layer(s) surrounding the second tube includes those already discussed above.

The second tube may be helically wound about the outermost reinforcement layer or about the core tube when the core tube is non-reinforced. The pitch angle may be selected as desired for a particular purpose or intended use. In one embodiment, the pitch is relatively long. In one embodiment, for example, the second tube is disposed about the core tube and/or outermost reinforcement layer at a pitch of about one to about two turns about every 15 feet.

The second tube may have a size as desired for a particular purpose or intended use. As shown in FIG. 2, the second tube 130 has an inner diameter $D_3$ and an outer diameter $D_4$. In one embodiment, for reasons illustrated later herein, the second tube may have an outer diameter $D_4$ less than the outer diameter $D_2$ of the core tube. The inner diameter $D_3$ of the second tube may also be smaller than the inner diameter $D_1$ of the core tube. For example, the inner diameter $D_1$ of the core tube may be at least about four times the inner diameter $D_3$ of the second tube, and the outer diameter $D_2$ of the core tube may be at least about four times the outer diameter $D_4$ of the second tube.

In forming the hose, the second tube may be at least partially embedded in the wall of the tubular jacket. That is, as shown in FIGS. 1 and 2, at least a portion of the second tube is incorporated within the wall of the tubular jacket. In one embodiment, the second hose is dimensioned and sized such that the tubular jacket and the final hose have a substantially cylindrical outer surface, as defined further herein. When the tubular jacket is formed over the second tube (and reinforcing layer and/or core tube), the outer surface of the tubular jacket may be slightly profiled in a region adjacent the second tube. It may be desirable to provide a second tube with a relatively small diameter to minimize the profile.

The tubular jacket, which may also be referred to as the cover or sheath, may be formed from any material suitable to contribute to or provide desired characteristics for the hose construction. The tubular jacket generally provides the hose construction with abrasion resistance and/or serves as a barrier to the environment. Suitable materials for the tubular jacket or cover layer include, for example, melt-processible, thermoplastic material, copolymer, alloy, or blend of a fiber, glass, ceramic, or metal-filled or unfilled polyamide, polyolefin, polyester, polyvinyl chloride, fluoropolymer, thermoplastic rubber (TPR), thermoplastic elastomer (TPE), thermoplastic olefin (TPO), or a thermoplastic polyurethane (TPU) elastomer. The materials suitable for the tubular jacket include those materials suitable for the core tube or the second tube. As with the core tube (e.g., tubes 110, 210), the tubular jacket (e.g., jackets 140, 250) alternatively may be formed of a vulcanizable natural or synthetic rubber such as SBR, polybutadiene, EPDM, butyl, neoprene, nitrile, polyisoprene, silicone, fluorosilicone, buna-N, copolymer rubbers, or blends such as ethylene-propylene rubber. Any of these materials forming the tubular jacket may be loaded with metal particles, carbon black, or another electrically-conductive particulate, flake, or fiber filler so as to render the hose electrically-conductive for static dissipation or other applications. Separate electrically-conductive fiber or resin layers (not shown), which may be in the form of spiral or "cigarette-wrapped" tapes or otherwise provided, also may be included in the hose construction between the core and the innermost reinforcement layer, between the reinforcement layers, or between the outermost reinforcement layer and cover.

As described above, the tubular jacket surrounds the second tube and the layer disposed immediately below the second tube (e.g., a reinforcement layer or the core tube). The tubular jacket may be generally circumferential and concentric with the core tube. In one embodiment, the tubular jacket, and thus the hose, may have a substantially cylindrical outer surface such that the hose has a substantially smooth outer surface, which may be desirable for particular applications. As described above, the second tube is at least partially embedded in the wall of the tubular jacket. As a result of the second tube being at least partially embedded in the tubular jacket, the tubular jacket may be slightly profiled in a region adjacent the second tube. Despite this, the hose still exhibits a substantially cylindrical, substantially smooth outer surface. As shown in FIG. 2, when viewed in radial cross-section, tubular jacket 140 is substantially cylindrical. As shown in FIG. 2A, which is an enlarged view of a section of FIG. 1, the tubular jacket 140 is substantially cylindrical but slightly deviates from a regular cylinder in a region A adjacent the second tube and between points 144a and 144b. The dashed line 146 represents the continuation of the cylindrical outer surface 142 of the tubular jacket if the tubular jacket were not profiled in the area surrounding the second tube. As show in FIG. 2A, the radius of the hose, as defined from the central, longitudinal axis 102 of the core tube to the outer surface of the tubular jacket, is substantially regular and begins to deviate in a region A. As shown in FIG. 2A, the hose 100 generally has a radius $r_1$ outside of the profiled region A. At any point within the profiled region A, the hose has a radius $r_n$ that is greater than $r_1$. It will be appreciated that the value of $r_n$ will vary from one point to another in the region A. Generally, there will be a maximum $r_n$ in region A. Desirably, the deviation between $r_1$ and the maximum $r_n$ is less than about 12%, and in one embodiment less than about 10%, and in one embodiment less than about 5%. As used herein, a tubular jacket and hose has a substantially cylindrical outer surface where the radius of the hose or tubular jacket in the profiled region (the region adjacent the second tube) is less than about 12%, in one embodiment less than about 10%, and in one embodiment less than about 5% greater than the regular radius of the hose in the non-profiled region of the tubular jacket.

It will be appreciated that the tubular jacket may not be profiled in the region of the second tube depending on the size of the second tube and/or the thickness of the tubular jacket.

If desired, the hose may include additional tubes for conveying or transporting additional fluids. The addition of more tubes similar to the second tube may provide a more convoluted or profiled hose surface such that hose may not have a substantially cylindrical configuration. Further, as the number of tubes disposed about the core tube increases, the flexibility of the hose may be compromised.

The hose may include any appropriate fittings or attachments, such as a threaded collar, nozzle, and the like, for connecting the hose to a fluid source and/or dispensing the fluids from the respective tubes within the hose. Any nozzle may be attached to the hose to dispense a fluid from each of the core tube and the second tube. The nozzle may be a conventional nozzle with a single exit port for dispensing the fluids. Using a standard nozzle, the respective fluids exit a distal end of the core tube and the second tube, which are in fluid communication with the nozzle, and enter a chamber in the nozzle prior to being dispensed through the nozzle's exit port. As the fluids exit the core tube and the second tube, respectively, they may be partially mixed in the nozzle head prior to being dispensed through the nozzle's exit port. It is also contemplated that special nozzles may be designed to separately dispense the respective fluids from the core tube and the second tube. For example, a nozzle could be provided with first and second chambers, and first and second exit ports in fluid communication with the first and second chambers, respectively. Each of the first and second chambers may have a fitting or attachment such that the core tube may be connected to one chamber, and the second tube may be connected to the other chamber. In this manner, the respective fluids remain separate and are separately dispensed from the hose through the respective exit ports in the nozzle such that the fluids are not mixed until after being dispensed from the hose to the desired location.

The hose may be made in any suitable manner. The core tube may be formed by any suitable method. For example, the core tube may be formed by wrapping methods in which a material is wrapped around a mandrel and cured. Alternatively, the core tube may be formed by extrusion. The reinforcement layers may be applied by wrapping or winding (such as in a spiral or helix) a suitable material around the core tube and/or around subsequent reinforcing layers. If desired, a fill layer may be disposed about each reinforcement layer and/or the outer most reinforcement layer. The second tube may be applied about the core tube or, if applicable, outermost reinforcement layer by winding the second tube around the particular layer in a desired pitch. The second tube may be formed and applied by an extrusion process. Alternatively, the second tube may be applied by winding a pre-formed tube about the core tube (or reinforcement layer). As described above, a fill layer may be disposed between the second tube and the immediately underlying layer (e.g., reinforcing layer or core tube). The tubular jacket may be applied over the second tube and the layer immediately beneath the second tube in any suitable manner including, for example, extrusion or wrapping. For example, where the tubular jacket is formed from a rubber, the rubber material may be wrapped around the second tube and the layer immediately underlying the second layer and then vulcanized to form the final hose construction.

Hoses in accordance with the present invention may be used in a variety of applications where it is desirable to separately transfer or convey two or more fluids. Hoses in accordance with the invention may be used, for example, to introduce different fluids into a subterraneous structure. A method for introducing different fluids into a subterraneous structure may include (i) introducing a fluid handling hose to a subterraneous bore hole, where the fluid handling hose comprises a first conduit for conveying a first reactant, and a second conduit for conveying a second reactant, (ii) conveying the first and second fluids to a down hole location of the bore hole, and (iii) combining the fluids. The fluids may be reactants that undergo a chemical reaction upon mixing and/or under suitable conditions. The hose may comprise a core tube, a second tube helically wound about the core tube, and a tubular jacket surrounding the second tube and the core tube. Alternatively, if desired, the hose may be used and the method may not include a tubular cover. The reactants may be introduced into a bore hole substantially simultaneously and combined within the bore hole. In another embodiment, the reactants may be at least partially combined within a nozzle attached to the hose.

In another embodiment, a method of transferring different fluids an/or introducing different fluids into a subterranean structure may employ a hose as shown in FIG. 4. With reference to FIG. 4, another exemplary hose 300 may include a core tube 310, a second tube 320 surrounding the core tube, and a tubular jacket 330. Hose 300 is similar in structure to hose 100 in FIG. 1. The core tube 310 of hose 300 comprises an aperture 319. A portion of the second tube 330 is inserted through the aperture 319 such that the distal end of the second tube is disposed within the bore of the core tube 310. As the fluid flowing through the second tube exits the distal end of the second tube, the fluid enters the first tube and is combined with the fluid flowing through the first tube. Mixing of the fluids may be accomplished by the natural, turbulent flow of the fluids. Depending on the length of the second tube that is present within the bore of the core tube, the flow of the fluid in the first tube and/or the flow of the fluid in the second tube may exert a force on the second tube such that the second tube moves within the bore of the core tube, such as by a spiraling or spinning motion, to facilitate mixing of the fluids. The aperture 319 is desirably sized for the second tube to snuggly fit through the aperture, so that the there is essentially a seal between the second tube and the aperture such that fluid flowing through the first tube dose not leak through the aperture. The location of the aperture may be selected as desired for a particular purpose or intended use. For example, the location of the aperture may be selected based on the reactivity of the materials being transported and the time at which it is desired to combine or mix the fluids. In one embodiment, the aperture 319 may be located nearer to a distal end of the core tube than to a proximate end of the core tube.

It will be appreciated that the hose 300 may comprise one or more reinforcement layers disposed between the core tube 310 and the second tube 320.

A hose in accordance with the present invention may be used, for example, in a strip mining operation to convey an explosive material and a secondary material, such as a catalyst, to a subterraneous bore hole. The hose may be configured to have a desired level of flexibility as well as chemical and mechanical properties. Typically, the core tube transports or conveys the explosive, and the second tube transports or conveys the secondary (catalyst) material. The materials used to form the core tube and the second tube may be selected as desired based upon the explosive material and the secondary material, respectively. Generally, the materials for the respective tubes should be chemically resistant to the fluids being conveyed therethrough. In one embodiment, the core tube comprises a rubber material, and the second tube comprises a nylon material. Desirably, the hose has a substantially cylindrical outer surface as previously described herein. The explosive material and secondary material may be conveyed to a bore hole substantially simultaneously and, depending on the hose configuration or nozzle employed, may be combined within the bore hole, at least partially mixed within a nozzle (diagrammatically illustrated at 335 in FIG. 4), or at least partially mixed within the core tube. When the hose is configured as shown in FIG. 4, it may be desirable to have the aperture located nearer to the distal end of the hose than to the proximate end of the hose.

While the hose and methods of using such a hose have been described with reference to introducing fluids into a subterranean structure, as is done in surface mining applications, it will be appreciated that a hose in accordance with the invention may be used in a variety of applications where it is desirable to separately transport two or more liquids from a first location to a second location using a single hose.

A hose for separately transporting two or more fluids in a single hose and method of using such a hose have been described with reference to the foregoing description including various exemplary embodiments. The exemplary embodiments are merely illustrative, and are not intended to limit the scope of the appended claims in any manner. It is appreciated that certain modifications may occur to persons skilled in the art upon reading the specification. It is intended that the invention include all such modifications as they come within the scope of the appended claims.

The invention claimed is:

1. A flexible hose for separately conveying at least two fluids from a proximal end of the hose to a distal end of the hose, the hose comprising:
    a core tube extending longitudinally from the proximal end to the distal end of the hose, the core tube for conveying a first fluid;
    a second tube helically wound about the core tube, the second tube for conveying a second fluid;
    a reinforcement layer surrounding the core tube and disposed intermediate the core tube and the second tube; and
    a tubular jacket surrounding the second tube and the core tube, the tubular jacket being substantially concentric with the core tube.

2. The hose according to claim 1, wherein the hose has a substantially cylindrical outer surface.

3. The hose according to claim 1, wherein the second tube is at least partially embedded in the tubular jacket.

4. The hose according to claim 1, wherein the core tube and the second tube each have an outer diameter, and the outer diameter of the core tube is at least about four times the outer diameter of the second tube.

5. The hose according to claim 1, wherein the core tube and the second tube each have an inner diameter, and the inner diameter of the core tube is at least about four times the inner diameter of the second tube.

6. The hose according to claim 1, wherein the second tube has a helical pitch of from about 1 to about 2 turns per 15 feet of hose.

7. The hose according to claim 1, further comprising an additional reinforcement layer surrounding the reinforcement layer, the additional reinforcement layer being disposed intermediate the core tube and the second tube.

8. A flexible hose for separately conveying at least two fluids from a proximal end of the hose to a distal end of the hose, the hose comprising:
    a core tube extending longitudinally from the proximal end of the hose to the distal end of the hose, the core tube for conveying a first fluid;
    a second tube helically wound about the core tube, the second tube for conveying a second fluid; and
    a tubular jacket surrounding the second tube, wherein the tubular jacket has a substantially cylindrical outer surface, and
    wherein the distal end of the core tube and a distal end of the second tube terminate at a juncture where at the at least two fluids conveyed therethrough are mixed together.

9. A method of introducing different reactants into a subterraneous structure, the method comprising:
    introducing a fluid handling hose to a bore hole in the subterraneous surface of an object to be mined, the fluid handling hose comprising:
        a core tube extending longitudinally from a proximal end of the hose to a distal end of the hose, the core tube providing a first conduit for conveying a first reactant;
        a second tube helically wound about the core tube, the second tube providing a second conduit for conveying a second reactant;
        a reinforcement layer surrounding the core tube and disposed intermediate the core tube and the second tube; and
        a tubular jacket surrounding the second tube and the core tube, the tubular cover being substantially concentric with the core tube;
    conveying the first and second reactants to a down hole location of the bore hole; and
    combining the reactants.

10. The method according to claim 9, wherein the reactants are conveyed to the bore hole substantially simultaneously and mixing of the reactants occurs within the hole.

11. The method according to claim 9, wherein the fluid handling hose further comprises a nozzle attached to the hose adjacent a distal end of the hose and in fluid communication with a distal end of each of the first and second conduits, and the reactants are at least partially mixed within the nozzle.

12. The method according to claim 9, wherein the second tube is at least partially embedded in the tubular jacket and the hose has a substantially cylindrical outer surface.

13. The method according to claim 9, wherein the core tube comprises an aperture, and a distal end of the second tube is fitted through the aperture such that at least a portion of the second tube is disposed within an interior region of the core tube.

14. The method according to claim 13, wherein the reactants are at least partially mixed in a portion of the core tube.

15. A flexible hose for separately conveying at least two fluids from a proximal end of the hose to a distal end of the hose, the hose comprising:
    a core tube extending longitudinally from the proximal end to the distal end of the hose, the core tube for conveying a first fluid;
    a second tube helically wound about the core tube, the second tube for conveying a second fluid; and a tubular jacket surrounding the second tube and the core tube, the tubular jacket being substantially concentric with the core tube, wherein the core tube comprises a first aperture and at least a portion of a distal end of the second tube is disposed through the first aperture such that at least a portion of the second tube is located within an interior region of the core tube.

16. The hose according to claim 15, wherein the hose has a substantially cylindrical outer surface.

17. The hose according to claim 15, wherein the second tube is at least partially embedded in the tubular jacket.

18. The hose according to claim 15, wherein the first aperture is located nearer to a distal end of the core tube than to a proximal end of the core tube.

19. A flexible hose for separately conveying at least two fluids from a proximal end of the hose to a distal end of the hose, the hose comprising:

a core tube extending longitudinally from the proximal end to the distal end of the hose, the core tube for conveying a first fluid;

a second tube helically wound about the core tube, the second tube for conveying a second fluid; and an external tubular jacket surrounding the second tube and the core tube, the external tubular jacket being substantially concentric with the core tube, wherein the second tube is at least partially embedded in the external tubular jacket.

20. The hose according to claim 19, wherein the hose has a substantially cylindrical outer surface.

* * * * *